(12) United States Patent
Cansfield et al.

(10) Patent No.: US 6,276,737 B1
(45) Date of Patent: Aug. 21, 2001

(54) STORAGE ASSEMBLY FOR AN OVERHEAD CONSOLE

(75) Inventors: Jonathan P. Cansfield; Paul R. Amos; Karl R. Stanley, all of Holland, MI (US)

(73) Assignee: Johnson Controls Interiors Technology Corp., Holland, MI (US)

( * ) Notice: Subject to any disclaimer, the term of this patent is extended or adjusted under 35 U.S.C. 154(b) by 0 days.

(21) Appl. No.: 09/479,184

(22) Filed: Jan. 7, 2000

(51) Int. Cl.[7] .............................. B60N 3/12; B60R 7/00; B60R 11/06
(52) U.S. Cl. .......................................... 296/37.8; 296/37.7
(58) Field of Search .................... 296/37.1, 37.7, 296/37.8; 16/348, 357

(56) References Cited

U.S. PATENT DOCUMENTS

| | | |
|---|---|---|
| 5,050,922 * | 9/1991 | Falcoff . |
| 5,522,638 * | 6/1996 | Falcoff et al. . |
| 5,775,762 | 7/1998 | Vitito . |
| 5,887,929 | 3/1999 | Miller er al. . |
| 5,890,692 | 4/1999 | Lee et al. . |
| 6,131,242 * | 10/2000 | Zipperle et al. . |
| 6,135,528 * | 10/2000 | Sobieski et al. . |

* cited by examiner

Primary Examiner—Joseph D. Pape
Assistant Examiner—Scott Carpenter
(74) Attorney, Agent, or Firm—Foley & Lardner

(57) ABSTRACT

A storage assembly for an overhead console of a vehicle including a storage member connected to the vehicle for pivotal movement from a retracted position to a deployed position, a tracking device mounted to the vehicle and defining a first guide track, and an arm member having a first end connected to the storage member for pivotal movement and a second end connected to the tracking device for sliding movement along the first guide track

21 Claims, 3 Drawing Sheets

STORAGE ASSEMBLY FOR AN OVERHEAD CONSOLE

TECHNICAL FIELD OF THE INVENTION

This invention generally relates to a storage assembly for an overhead console of a vehicle. More specifically, this invention relates to a storage assembly including a storage member connected to the vehicle for pivotal movement from a retracted position to a deployed position.

BACKGROUND

Providing a storage assembly for an overhead console of a vehicle has been a long-standing challenge for automotive suppliers and manufacturers. While some storage assemblies in current vehicles are connected to the vehicle for pivotal movement from a retracted position to a deployed position, these storage assemblies either function with awkward movements or, if provided with a dampening device, require a relatively large and deep mounting area. In current vehicles with sloping windshields, overhead consoles fitted with components that require a relatively large and deep mounting area infringe on the interior space of the vehicle at the discomfort of the passengers.

SUMMARY OF THE INVENTION

Accordingly, this invention provides for a storage assembly for an overhead console of a vehicle that overcomes the problems and disadvantages of the conventional techniques in the art. The invention also provides for a storage assembly that is relatively compact and inexpensive, and that functions with smooth movements.

Briefly, the invention includes a storage assembly for an overhead console of a vehicle having a storage member connected to the vehicle for pivotal movement from a retracted position to a deployed position, a tracking device mounted to the vehicle and defining a first guide track, and an arm member having a first end connected to the storage member for pivotal movement and a second end connected to the tracking device for sliding movement along the first guide track.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
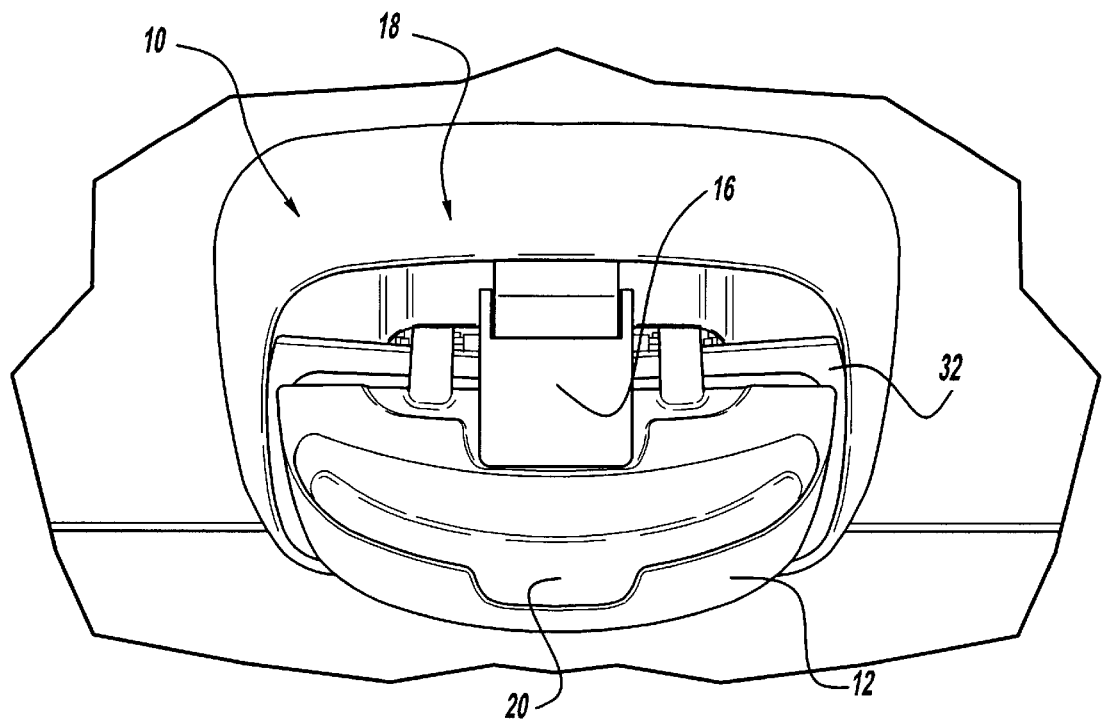
FIG. 1 is a perspective view of the storage assembly of the preferred embodiment of the invention, shown in a deployed position as a portion of an overhead console of a vehicle.
Figure 2:
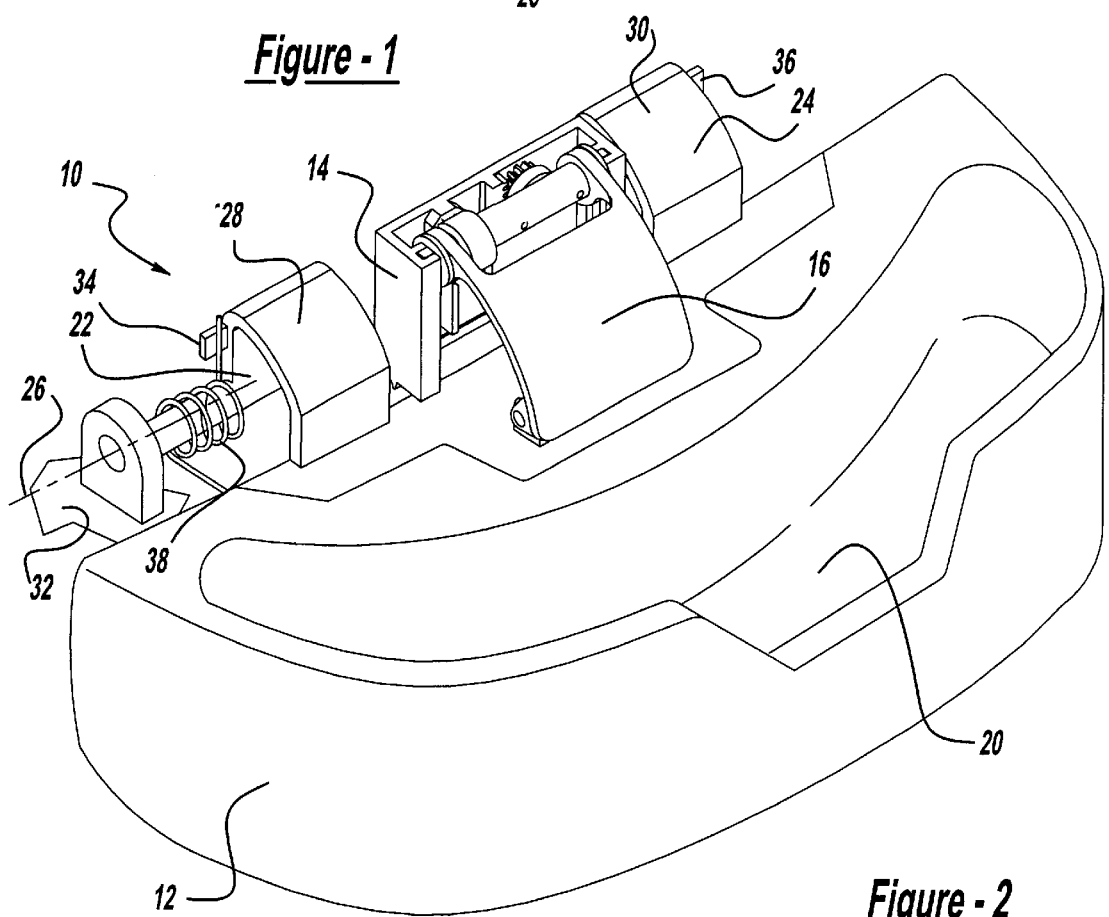
FIG. 2 is a perspective view of the storage assembly of the preferred embodiment of the invention, shown in a retracted position.

As shown in FIGS. 1 and 2, the storage assembly 10 of the preferred embodiment of the invention includes a storage member 12, a tracking device 14, and an arm member 16. The storage assembly 10 is preferably a portion of an overhead console 18 of a vehicle, while other components, such as lights, speakers, and trip computers, may be incorporated as the other portions. Although the storage assembly 10 is especially designed for the overhead console 18, the storage assembly 10 may be mounted in other areas of the interior of the vehicle, such as the instrument panel, the door panels, and the center console between the passenger seats.

The storage member 12 includes a storage cavity 20 to contain small cargo, such as eyeglasses. Preferably, the storage cavity 20 is formed with a crescent shape to conform to the general curve of most eyeglasses. Alternatively, the storage cavity 20 may be formed with other shapes to conform to the general shape of other objects, such as portable phones or note pads. In the preferred embodiment, the storage cavity 20 is accessible only when the storage member 12 is pivoted into a deployed position (shown in FIG. 1). Thus, when the storage member 12 is pivoted into a retracted position (shown in FIG. 2), the cargo contained within the storage cavity 20 is substantially prevented from any spillage. In an alternative embodiment, the storage cavity 20 may be accessible both when the storage member 12 is pivoted into the deployed position and when the storage member 12 is pivoted into the retracted position. The storage member 12 is preferably made from a hard plastic material with conventional methods in the art, but may be made with other suitable materials and from other suitable methods.

Figure 3:
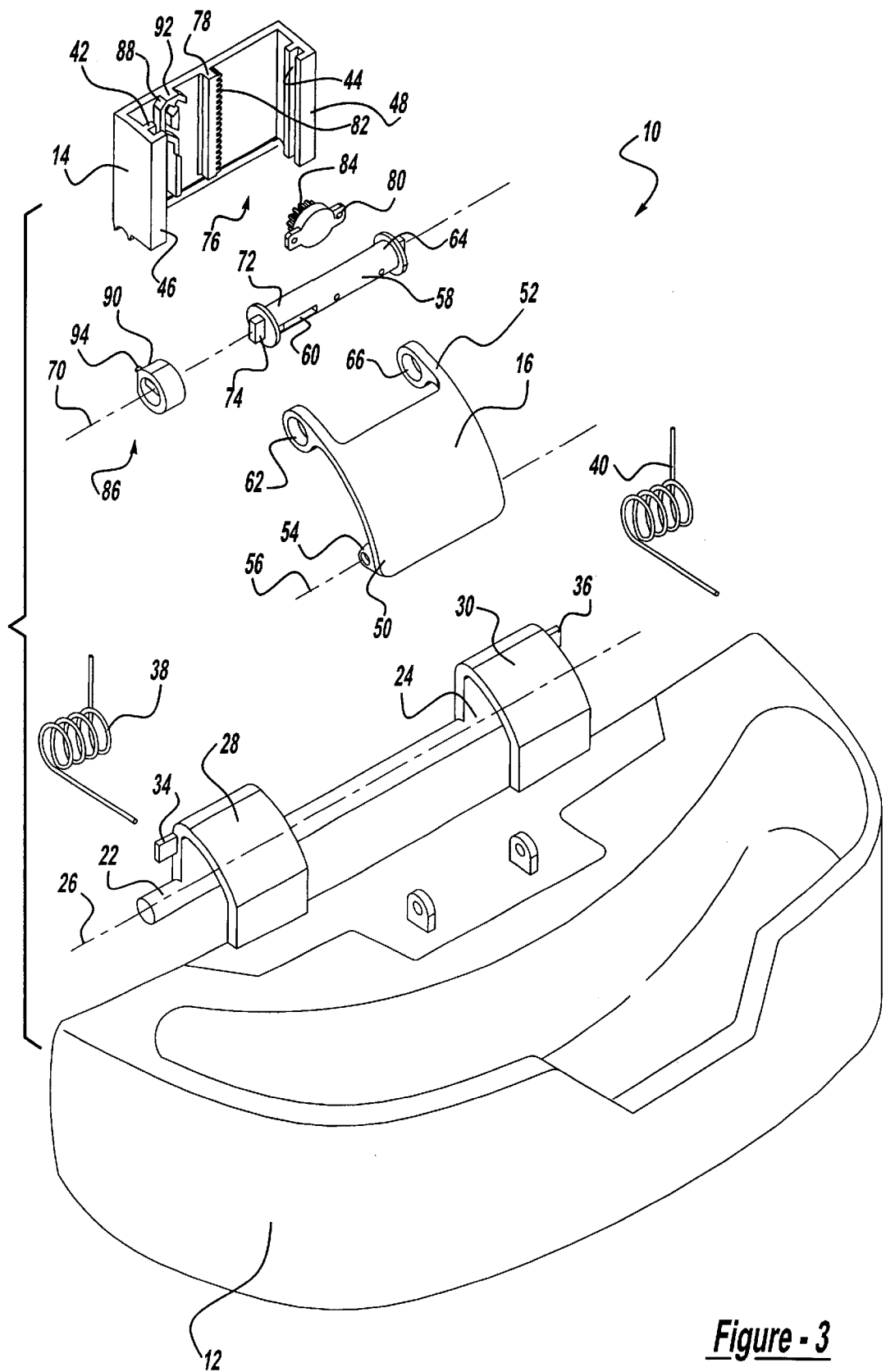
FIG. 3 is an exploded view of the storage assembly of the preferred embodiment of the invention.

As shown in FIGS. 2 and 3, the storage member 12 is connected to the vehicle or pivotal movement from the retracted position to the deployed position by a first pivot device 22 and a second pivot device 24. The first pivot device 22 and the second pivot device 24, which preferably share a first axis 26, preferably include a conventional pin-and-socket arrangement, but may alternatively include other arrangements. The first pivot device 22 and the second pivot device 24 further preferably include a first hinge extension 28 and a second hinge extension 30. The first hinge extension 28 and the second hinge extension 30 function to allow the hidden placement of the first pivot device 22 and the second pivot device 24 behind a surface element 32 (shown in FIG. 2) of the overhead console 18 (shown in FIG. 1). In other words, the first pivot device 22 and the second pivot device 24 are substantially hidden from a vantage in the interior of the vehicle when the storage member 12 is pivoted into the retracted position.

The first hinge extension 28 and the second hinge extension 30 preferably include a first spring finger 34 and a second spring finger 36. The first spring finger 34 and the second spring finger 36 contact a first spring 38 and a second spring 40 (shown in FIG. 3), which function to oppose the gravitational force acting upon the storage member 12. Preferably, the first spring 38 and the second spring 40 are conventional torsional springs, but may alternatively be any spring-like device that provides slow and calculated pivotal movement of the storage member 12 from the retracted position to the deployed position.

Figure 4:
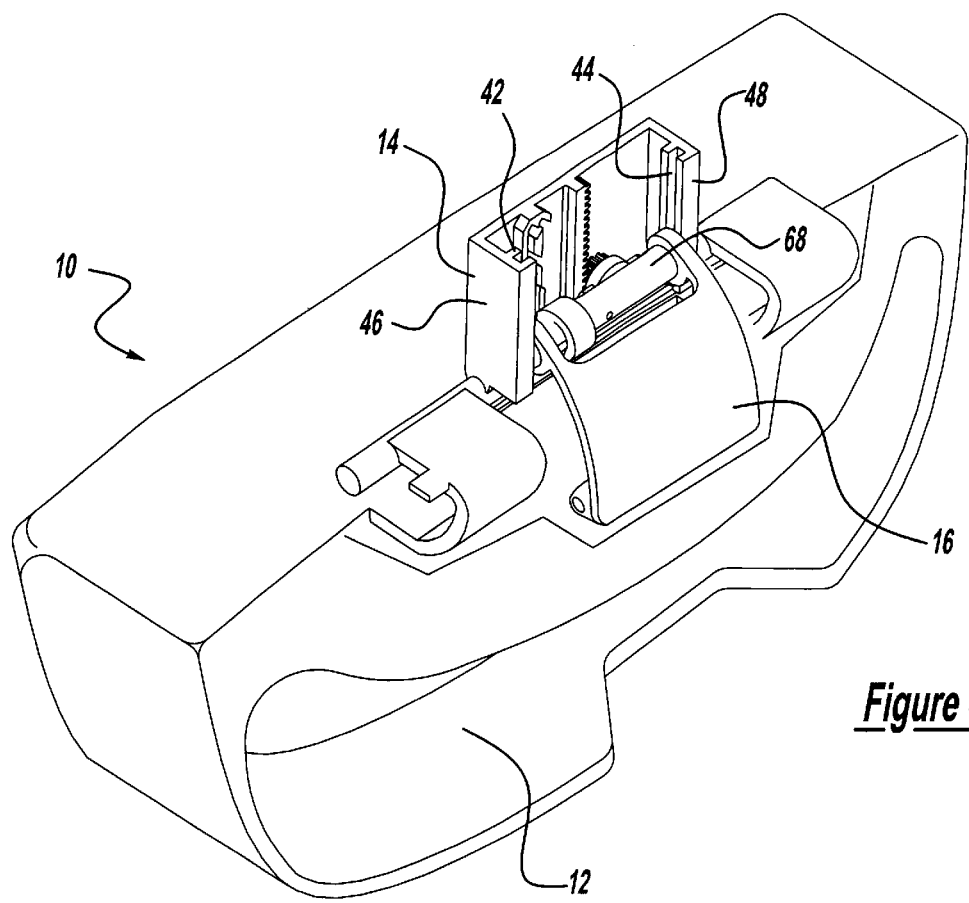
FIG. 4 is a perspective view of the storage assembly of FIG. 2, shown in a deployed position.

As shown in FIGS. 3 and 4, the tracking device 14 defines a first guide track 42 and a second guide track 44 to guide the storage member 12 from the retracted position to the deployed position. The tracking device 14 preferably includes a first support member 46 and a second support member 48, both extending from the tracking device 14 and providing surfaces for the first guide track 42 and the second guide track 44. The tracking device 14 is preferably formed as an independent part and mounted to the overhead console of the vehicle with the use of a fastener (not shown), such as screws, bolts, nails, tacks, staples, adhesives, or other suitable devices. The tracking device 14 may alternatively be formed as an integral part of the overhead console, or as an integral part of the vehicle itself. Like the storage member 12, the tracking device 14 is preferably formed from a hard plastic material with conventional methods in the art, but may be formed from other suitable materials and with other suitable methods.

As shown in FIG. 3, the arm member 16 includes a first end 50 connected to the storage member 12 for pivotal movement and a second end 52 connected to the tracking device 14 for sliding movement along the first guide track 42 and the second guide track 44. With the first end 50 connected for pivotal movement and the second end 52 connected for sliding movement, the arm member 16 functions to translate the pivotal movement into sliding movement. The arm member 16 is preferably connected to the storage member 12 by a third pivot device 54. The third pivot device 54 defines a second axis 56, which is distant from but parallel with the first axis 26. Like the first pivot device 22 and the second pivot device 24, the third pivot device 54 preferably includes a conventional pin-and-socket arrangement, but may alternatively include other arrangements. Preferably, the arm member 16 is formed with a slightly curved shape, from a hard plastic material, and with conventional methods in the art. Alternatively, the arm member 16 may be formed with other suitable shapes, from other suitable materials, and with other suitable methods.

Figure 5:
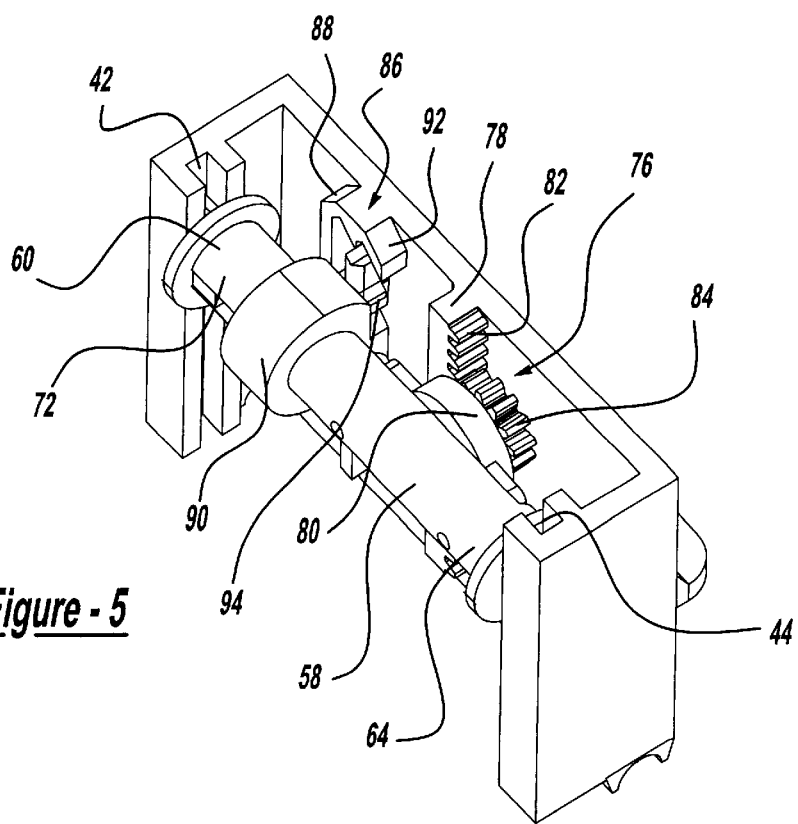
FIG. 5 is a detailed view of the tracking device and the arm member of the preferred embodiment of the invention.

As shown in FIGS. 3 and 5, the storage assembly 10 of the preferred embodiment includes a hub member 58 connected to the second end 52 of the arm member 16 for sliding movement within the first guide track 42 and within the second guide track 44. The hub member 58 preferably includes a first section 60 extending through a first bore 62 in the arm member 16 and connecting with the first guide track 42 and a second section 64 extending through a second bore 66 in the arm member 16 and connecting with the second guide track 44. The first section 60, the first bore 62, the second section 64, and the second bore 66 are axially aligned. The first section 60 and the second section 64, which preferably include a smooth cylindrical portion 72 and a smooth rectangular portion 74, are preferably formed as an independent part and fastened to the hub member 58 with an adhesive (not shown) or other suitable device. Alternatively, the first section 60 and the second section 64 may be formed as an integral part of the hub member 58. Since the hub member 58 is preferably limited against rotational movement, the hub member 58 acts as a fourth pivot device 68 (shown in FIG. 4) and defines a third axis 70 during the complex movement of the arm member 16 from the retracted position to the deployed position. The hub member 58, the first section 60, and the second section 64 are preferably formed from a hard plastic material with conventional methods in the art, but may alternatively be formed from other suitable materials and with other suitable methods.

The storage assembly 10 of the preferred embodiment of the invention further includes a dampening device 76 to dampen the sliding movement of the hub member 58 within the first guide track 42 and the second guide track 44. The dampening device 76 includes a first portion 78 connected to the tracking device 14 and a second portion 80 connected to the hub member 58. Preferably, the first portion 78 includes a rack member 82 and the second portion 80 includes a pinion member 84 with an internal friction device (not shown), such as a bushing. The rack member 82 is preferably formed as an integral part of the tracking device 14, but may alternatively be formed as an independent part and fastened to the tracking device 14 with an adhesive or other device. The pinion member 84, which is connected to the hub member 58 for rotational movement, mates with the rack member 82 to translate the sliding movement of the hub member 58 into rotational movement of the pinion member 84. The rotational movement of the pinion member 84 causes friction in the internal friction device that dampens the sliding movement of the hub member 58 and, more importantly, dampens the pivotal movement of the storage member 12. The dampening of the pivotal movement of the storage member 12 allows the storage assembly 10 to mimic the motion control of other storage assemblies that are more expensive and more complex. The rack member 82 and the pinion member 84 of the dampening device 76 are preferably formed from conventional materials with conventional materials in the art, but may alternatively be formed from other suitable materials and with other suitable methods.

The storage assembly 10 of the preferred embodiment further includes a locking device 86 to selectively allow the pivotal movement of the storage member 12 from the retracted position to the deployed position. The locking device 86 includes a first segment 88 connected to the tracking device 14 and a second segment 90 connected to the hub member 58. The first segment 88 preferably includes a push-push track 92. The push-push track 92 is preferably formed as an integral part of the tracking device 14, but may alternatively be formed as an independent part and fastened to the tracking device 14 with an adhesive or other suitable device. The second segment 90 of the locking device 86 preferably includes a push-push pin 94 rotatably mounted on the hub member 58 and rotatably biased towards the push-push track 92 by a third spring (not shown). The push-push pin 94 and the push-push track 92 cooperate to selectively hold the storage member 12 in the retracted position after the storage member 12 has been pushed in a first direction from the deployed position to the retracted position. The push-push pin 94 and the push-push track 92 also cooperate to selectively allow pivotal movement of the storage member 12 in a second direction, opposite the first direction, after the storage member 12 has been pushed in the first direction. Locking devices, such as the locking device 86 with the push-push track 92 and the push-push pin 94, are known and used in the art of vehicle interiors and their implementation in the storage assembly 10 of the invention would be readily understood by a person of ordinary skill in the art.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A storage assembly for an overhead console of a vehicle, said storage assembly comprising:
   a storage member connected to the vehicle for pivotal movement from a retracted position to a deployed position;
   a tracking device mounted to the vehicle and defining a first guide track and a second guide track;
   an arm member having a first end connected to said storage member for pivotal movement, and a second end;
   a hub member connected to said second end of said arm member, said hub member having a first section connected to said first guide track for sliding movement within said first guide track and a second section connected to said second guide track for sliding movement within said second guide track; and a dampening device having a first portion engagable with said tracking device and a second portion engagable with said hub member, said dampening device being operable to dampen the sliding movement of said hub member within said first guide track and said second guide track.

2. The storage assembly of claim 1 wherein said first portion of said dampening device includes a rack member connected to said tracking device, and wherein said second portion of said dampening device includes a pinion member connected to said hub member for rotational movement.

3. The storage assembly of claim 2 further comprising a locking device having a first segment connected to said tracking device and a second segment connected to said hub member, said locking device being operable to selectively hold said storage member in the retracted position, and to selectively allow the pivotal movement of said storage member from the retracted position to the deployed position.

4. The storage assembly of claim 3 wherein said first segment of said locking device includes a push-push track connected to said tracking device, and wherein said second segment of said locking device includes a push-push pin connected to said hub member, and wherein said locking is operable to selectively hold said storage member after said storage member is pushed in a first direction from the deployed position to the retracted position, and to selectively allow pivotal movement of said storage member in a second direction opposite the first direction after said storage member is pushed in the first direction.

5. A storage assembly for an overhead console of a vehicle, said storage assembly comprising:

a storage member connected to the vehicle for pivotal movement from a retracted position to a deployed position;

a tracking device mounted to the vehicle and defining a first guide track;

an arm member having a first end connected to said storage member for pivotal movement and a second end connected to said tracking device for sliding movement along said first guide track; and a locking device having a first segment connected to said tracking device and a second segment connected to said arm member, said locking device being operable to selectively hold said storage member in the retracted position, and to selectively allow the pivotal movement of said storage member from the retracted position to the deployed position.

6. The storage assembly of claim 5 wherein said storage member defines a storage cavity to contain eyeglasses, said storage cavity being accessible when said storage member is pivoted into the deployed position.

7. The storage assembly of claim 5 further comprising a dampening device having a first portion engagable with said tracking device and a second portion engagable with said arm member, said dampening device being operable to dampen the sliding movement of said arm member along said first guide track.

8. The storage assembly of claim 7 wherein said first portion of said dampening device includes a rack member connected to said tracking device, and wherein said second portion of said dampening device includes a pinion member connected to said second end of said arm member for rotational movement along said track member.

9. The storage assembly of claim 5 wherein said first segment of said locking device includes a push-push track connected to said tracking device, and wherein said second segment of said locking device includes a push-push pin connected to said second end of said arm member, and wherein said locking is operable to selectively hold said storage member after said storage member is pushed in a first direction from the deployed position to the retracted position, and to selectively allow pivotal movement of said storage member in a second direction opposite the first direction after said storage member is pushed in the first direction.

10. The storage assembly of claim 5 wherein said tracking device defines a second guide track.

11. The storage assembly of claim 10 further comprising a hub member connected to said second end of said arm member, said hub member having a first section connected to said first guide track for sliding movement within said first guide track and a second section connected to said second guide track for sliding movement within said second guide track.

12. The storage assembly of claim 11 further comprising a dampening device having a first portion engagable with said tracking device and a second portion engagable with said hub member, said dampening device being operable to dampen the sliding movement of said hub member within said first guide track and said second guide track.

13. The storage assembly of claim 12 wherein said first portion of said dampening device includes a rack member connected to said tracking device, and wherein said second portion of said dampening device includes a pinion member connected to said hub member for rotational movement.

14. A storage assembly for an overhead console of a vehicle, said storage assembly comprising:

a storage member connected to the vehicle for pivotal movement from a retracted position to a deployed position;

a tracking device mounted to the vehicle and defining a first guide track and a second guide track;

an arm member having a first end connected to said storage member for pivotal movement and a second end connected to said tracking device for sliding movement along said first guide track; and a hub member connected to said second end of said arm member, said hub member having a first section connected to said first guide track for sliding movement within said first guide track and a second section connected to said second guide track for sliding movement within said second guide track a locking device having a first segment connected to said tracking device and a second segment connected to said hub member, said locking device being operable to selectively hold said storage member in the retracted position, and to selectively allow the pivotal movement of said storage member from the retracted position to the deployed position.

15. The storage assembly of claim 14 wherein said first segment of said locking device includes a push-push track connected to said tracking device, and wherein said second segment of said locking device includes a push-push pin connected to said hub member, and wherein said locking is operable to selectively hold said storage member after said storage member is pushed in a first direction from the deployed position to the retracted position, and to selectively allow pivotal movement of said storage member in a second direction opposite the first direction after said storage member is pushed in the first direction.

16. A storage assembly for an overhead console of a vehicle, said storage assembly comprising:
   a storage member connected to the vehicle for movement from a retracted position to a deployed position;
   a tracking device mounted to the vehicle and providing a first guide and a second guide;
   an arm member having a first end coupled to said storage member and a second end; and
   a hub member connected to said second end of said arm member, said hub member having a first section coupled to said first guide for movement within said first guide and a second section coupled to said second guide for movement within said second guide.

17. The storage assembly of claim 16 further comprising a dampening device having a first portion engagable with said tracking device and a second portion engagable with said hub member, said dampening device being operable to dampen the movement of said hub member within said first guide and said second guide.

18. The storage assembly of claim 17 wherein said first portion of said dampening device includes a rack member coupled to said tracking device, and wherein said second portion of said dampening device includes a pinion member connected to said hub member for rotational movement.

19. The storage assembly of claim 16 wherein said storage member pivots between the retracted position and the deployed position.

20. The storage assembly of claim 16 further including a locking device having a first segment connected to said tracking device and a second segment connected to said arm member, said locking device being operable to selectively hold said storage member in the retracted position, and to selectively allow the pivotal movement of said storage member from the retracted position to the deployed position.

21. The storage assembly of claim 16 wherein movement along said first guide and said second guide is sliding movement.

* * * * *